United States Patent

Kono et al.

Patent Number: 5,224,404
Date of Patent: Jul. 6, 1993

[54] POLYGON WORKING METHOD

[75] Inventors: Shinichi Kono; Takahiro Akiyama, both of Yamanashi, Japan

[73] Assignee: Fanuc Ltd, Minamitsuru, Japan

[21] Appl. No.: 863,301

[22] PCT Filed: Oct. 29, 1991

[86] PCT No.: PCT/JP91/01476

§ 371 Date: Jun. 24, 1992

§ 102(e) Date: Jun. 24, 1992

[87] PCT Pub. No.: WO92/07684

PCT Pub. Date: May 14, 1992

[30] Foreign Application Priority Data

Oct. 29, 1990 [JP] Japan .................. 2-288388

[51] Int. Cl.$^5$ .................. B23B 1/00; B23B 5/44
[52] U.S. Cl. .................. 82/18; 82/1.11
[58] Field of Search .................. 82/1.11, 18, 118, 119

[56] References Cited

U.S. PATENT DOCUMENTS

| 167,614 | 9/1875 | Koch et al. | 82/18 |
| 469,813 | 3/1892 | Dahlgren et al. | 82/18 |
| 1,485,687 | 3/1924 | Melling | 82/18 |
| 4,949,443 | 8/1990 | Saruwatari | 29/27 C |

FOREIGN PATENT DOCUMENTS

| 59-152001 | 8/1984 | Japan . |
| 62-236603 | 10/1987 | Japan . |
| 63-99114 | 4/1988 | Japan . |
| 64-40214 | 2/1989 | Japan . |
| WO 88/08346 | 11/1988 | PCT Int'l Appl. . |

Primary Examiner—William E. Terrell
Attorney, Agent, or Firm—Staas & Halsey

[57] ABSTRACT

A polygon working method in which a polygonal portion can be formed on a workpiece in such a manner that a specific region of the polygonal portion is accurately in alignment with a predetermined circumferential position on the workpiece. In this method, the workpiece and a tool are simultaneously rotated in a manner such that a cutter of the tool is opposed to a circumferential workpiece position deviated from a predetermined circumferential position of the workpiece by the amount corresponding to the difference between a first positional deviation (PE1), which is produced during the time interval between the start of the rotation of a first main spindle (3a) fitted with the workpiece (1) and the establishment of a steady-state operation mode, in which the first and second main spindles (3a, 3b) rotate with a predetermined rotational speed ratio, and a second positional deviation (PE2), which is produced during the time interval between the start of the rotation of the second main spindle fitted with the tool and the establishment of the steady-state operation mode, and tool feed is started when the steady-state operation mode is established.

3 Claims, 3 Drawing Sheets

POLYGON WORKING METHOD

TECHNICAL FIELD

The present invention relates to polygon working for forming a polygonal portion on a workpiece, more particularly to a polygon working method capable of forming a polygonal portion such that the angle of the polygonal portion is in alignment with a predetermined circumferential position on a workpiece.

BACKGROUND ART

In general, polygonal products, such as bolt heads, are manufactured by using, for example, a milling machine. In this case, the peripheral surface of a polygonal portion, including a plurality of faces, must be formed face by face, thus entailing a long working time and high working cost. As a measures for eliminating such an awkward situation, polygon working is known. In this method, a workpiece is worked to form a portion having a polygonal section using one or more cutters of a tool by relatively feeding the workpiece mounted on one main spindle of a machine tool and the tool mounted on the other main spindle, while rotating the workpiece and the tool with a predetermined rotational speed ratio (International Application No. PCT/JP87/00795).

According to the polygon working, a workpiece can be quickly worked to have a square or hexagonal form at low cost by rotating, for example, a tool having two cutters arranged at an angular distance of 180° from eath other in the circumferential direction of the tool, or a tool having three cutters arranged at intervals of 120° in the circumferential direction of the tool at a speed twice as high as the rotational speed of the workpiece, using a relatively low-priced lathe.

However, in forming a polygonal portion on the workpiece that a specific region of the polygonal portion, e.g., an angle of the polygonal portion, is in alignment with a predetermined circumferential position on the workpiece, even where the respective rotations of the workpiece and the tool are simultaneously started with the cutter(s) of the tool situated in the predetermined circumferential position on the workpiece, and the relative feed of the workpiece and the tool is started when a steady-state operation mode is established for enabling the workpiece and the tool to rotate with a predetermined rotational speed ratio, it is actually difficult to align the angle of the polygonal structure accurately with the predetermined circumferential position on the workpiece. Thus, it is difficult to manufacture a product such that, for example, an angle of a hexagonal portion formed on one end of the product and its corresponding angle of a square portion formed on the other end of the product are accurately in alignment with each other with respect to the circumferential direction of the workpiece.

DISCLOSURE OF THE INVENTION

The object of the present invention is to provide a polygon working method in which a polygonal portion can be formed on a workpiece in such a manner that a specific region of the polygonal structure is accurately in alignment with a predetermined circumferential position on the workpiece.

In order to achieve the above object, according to the present invention, there is provided a polygon working method for a machine tool having the first main spindle fitted with a workpiece and the second main spindle fitted with a tool, the polygon working method comprising: (a) starting simultaneously the rotation of the first and second main spindles with a cutter of the tool opposed to a circumferential position of workpiece, which is deviated from the predetermined circumferential position of the workpiece by the amount corresponding to the difference between a first positional deviation, which is produced in association with the first main spindle during the time interval between the start of the rotation of the first main spindle and the establishment of a steady-state operation mode such that the first and second main spindles rotate with a predetermined rotational speed ratio, and a second positional deviation, which is produced in association with the second main spindle during the time interval between the start of the rotation of the second main spindle and the establishment of the steady-state operation mode; and (b) starting relative feed of the workpiece and the tool when the steady-state operation mode is established.

As described above, according to the present invention, the drive of the first main spindle, fitted with the workpiece, and the second main spindle, fitted with the tool, is started with the cutter of the tool opposed to the circumferential workpiece position deviated from the predetermined circumferential position of the workpiece for the difference between the first and second positional deviations respectively with respect to the first and second main spindles, before the establishment of the steady-state operation mode for the rotation of the first and second main spindles with the predetermined rotational speed ratio, and the relative feed of the workpiece and the tool is then started when the steady-state operation mode is established. As a result, at the start of the relative feed for the start of the polygon working, the steady-state operation mode is established, and the cutter of the tool accurately faces the predetermined circumferential position on the workpiece. Thus, the polygonal portion can be formed on the workpiece in the manner such that the specific region of the polygonal portion accurately coincides with the predetermined circumferential position on the workpiece. Thus, the workpiece can be worked in a manner such that the corresponding angles of identical or different polygonal portions formed individually on the opposite ends of the workpiece are situated in the same position with respect to the circumferential direction of the workpiece, for example.

BEST MODE OF CARRYING OUT THE INVENTION

Figure 1:
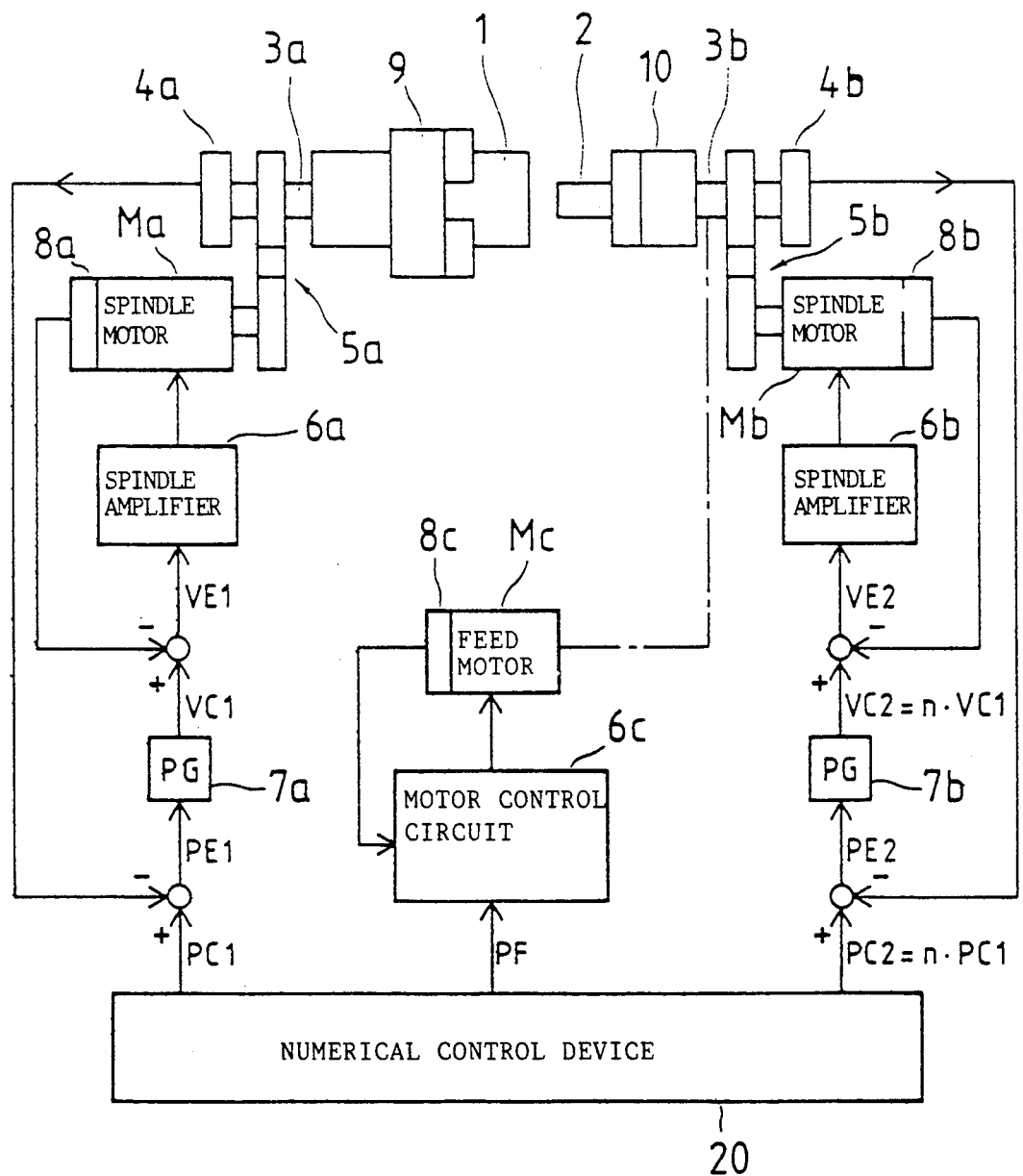
FIG. 1 is a block diagram showing the principal part of a machine tool for carrying out a polygon working method according to one embodiment of the present invention.

Referring to FIG. 1, an NC machine tool for polygon working comprises the first main spindle 3a with a chuck 9 for releasably holding a workpiece 1 and the second main spindle 3b with a chuck 10 for releasably holding a tool 2. The first and second position coders 4a and 4b for detecting the respective rotational positions of the main spindles are mounted on the two main spindles 3a and 3b respectively. The second main spindle 3b extends in parallel to the first main spindle 3a, and is movable toward and away from the first main spindle 3a, in the direction perpendicular to the drawing plane of FIG. 1. The tool 2, as will be described in detail later, has one cutter or a plurality of cutters arranged at regular angular intervals in the circumferential direction of the tool. Further, the first and second main spindles 3a and 3b are drivablly connected to the first and second spindle motors Ma and Mb through the first and second transmission systems 5a and 5b respectively so that they can be driven to rotate. The second main spindle 3b is drivablly connected to a tool feed motor Mc through a third transmission system (not shown) so that it can be driven toward and away from the first main spindle 3a. The first and second speed sensors 8a and 8b for detecting the respective rotational speeds of the motors are attached to the first and second spindle motors Ma and Mb respectively, and a position sensor 8c is attached to the tool feed motor Mc.

The machine tool further comprises a numerical control device 20, the first motor control circuit comprising the first spindle amplifier 6a and the first compensator 7a, the second motor control circuit comprising the second spindle amplifier 6b and the second compensator 7b, and the third motor control circuit 6c for driving the tool feed motor Mc. The first motor control circuit constitutes the first control section for controlling the rotation of the first spindle motor Ma in cooperation with the control device 20, while the second motor control circuit constitutes the second control section for controlling the rotation of the second spindle motor Mb in cooperation with the control device 20.

The numerical control device 20 comprises a processor, a read-only memory loaded with management programs and the like, a random access memory for temporary storage of data and the like, a nonvolatile memory stored with a polygon working program, various set values, etc., a tape reader, and a manual data input device (none of these components are shown). In order to control workpiece rotation, tool rotation, and tool feed in accordance with the polygon working program to be executed by the processor, the numerical control device 20 cyclically delivers the pulses whose numbers correspond individually to the first move command PC1 for workpiece rotation, the second move command PC2 for tool rotation, and the feed command PF for tool feed in a predetermined pulse distribution cycle ITP.

The first compensator 7a, which constitutes a position loop of the first motor control circuit, receives the deviation (first positional deviation) PE1 between the first move command PC1 from the numerical control device 20 and a position detection output from the first position coder 4a, and delivers the first speed command VC1 obtained by multiplying the first positional deviation PE1 by the first position loop gain PG1. The first spindle amplifier 6a, which constitutes the speed loop section of the first motor control circuit, rotates the first spindle motor Ma at the first command speed corresponding to the command workpiece rotational speed, in accordance with a deviation (first speed deviation) VE1 between the first speed command VC1 from the first compensator 7a and a speed detection output from the first speed sensor 8a.

Likewise, the second compensator 7b delivers the second speed command VC2 obtained by multiplying the second positional deviation PE2, the deviation between the second move command PC2 from the control device 20 and the output from the second position coder 4b, by a second position loop gain PG2, and the second spindle amplifier 6b rotates the second spindle motor Mb at a second command speed corresponding to a command tool rotational speed, in accordance with a second speed deviation VE2, i.e. the deviation between the second speed command VC2 and the output from the second speed sensor 8b.

Figure 2:
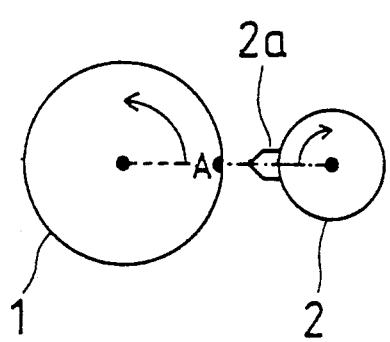
FIG. 2 is a schematic view illustrating the polygon working method in which the respective rotations of a workpiece and a tool are started with a cutter of the tool opposed to a predetermined point of the workpiece.

In the polygon working by means of the machine tool constructed in this manner, the workpiece rotation and tool rotation are simultaneously started with a cutter 2a of the tool 2 situated in a predetermined circumferential position A on the workpiece 1, as shown in FIG. 2. In this case, even if the tool feed is started when a steady-state operation mode is established in the manner such that the workpiece 1 and the tool 2 rotate at the predetermined rotational speed ratio 1:n, it is difficult to form a polygonal portion on the workpiece 1 with the middle point of a side of the polygonal portion in alignment with the predetermined position A. The following is a description of the reason for this.

If the steady-state operation mode is established in the xth pulse distribution cycle, counting from the start of the simultaneous rotations of the workpiece and the tool, and therefore, if both the command workpiece rotational speed and the command tool rotational speed are reached, actual rotational positions L1 and L2 of the first main spindle 3a (workpiece) and the second main spindle 3b (tool) can be given by the following equations (1) and (2) respectively.

$$L1 = PC1 \cdot x - PE1, \qquad (1)$$
$$L2 = PC2 \cdot x - PE2 \qquad (2)$$
$$= n \cdot PC1 \cdot x - PE2.$$

Here PC1 (pulse/ITP) and PC2 (pulse/ITP) are the move command variables for one pulse distribution cycle associated with the first and second main spindles 3a and 3b respectively, PC1·x and PC2·x represent total move command variables (total number of pulses delivered during first to Xth pulse distribution cycles) for the first and second main spindles 3a and 3b respectively; and PE1 and PE2 represent the first and second positional deviations produced in association with the first and second main spindles 3a and 3b respectively during the time interval between the start of the respective rotations of the workpiece and the tool and the establishment of the steady-state operation mode. The positional deviations PE1 and PE2 are given by the following equations (3) and (4):

$$PE1 = (VC1/60) \cdot P \cdot (1/PG), \qquad (3)$$
$$PE2 = (VC2/60) \cdot P \cdot (1/PG) \qquad (4)$$

$$= (n \cdot VC1/60) \cdot P \cdot (1/PG).$$

Here VC1 (rpm) and VC2 (rpm) represent the first and second speed commands respectively, P (pulse/one revolution) represents the number of pulses delivered from the first and second position coders 4a and 4b while each of the first and second main spindles 3a and 3b makes one revolution, and PG (sec$^{-1}$) represents each of the first and second position loop gains (PG1=PG2).

As seen from equations (1) and (2), if the respective rotations of the workpiece and the tool are not subject to delay in following up the move commands, and thus the first and second positional deviations PE1 and PE2 are not produced, the cutter 2a of the tool 2, which revolves n-number of times while the workpiece 1 makes one revolution, is aligned with the predetermined circumferential position A on the workpiece 1, on the condition that the first move command variable PC1·x is divisible by the pulse number P, that is, with every revolution of the workpiece 1. Actually, however, the first and second positional deviations PE1 and PE2 occurs, so that the point A of the workpiece 1 and the cutter 2a are situated at the positions delayed by the deviations PE1 and PE2 respectively, compared with the positions which can be reached if these deviations PE1 and PE2 have not occurred, when the steady-state operation mode is established. Thus, it is impossible to form a polygonal portion such that the middle point of a side of the polygonal portion is in alignment with the predetermined circumferential position A on the workpiece 1.

Figure 3:
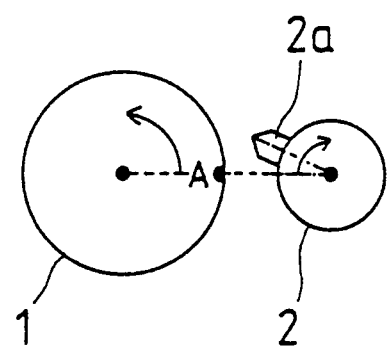
FIG. 3 is a schematic view showing the relative positions of the workpiece and the tool cutter at the start of the respective rotations of the workpiece and the tool in the polygon working method according to the embodiment of the present invention.

According to the present invention, therefore, the point A of the workpiece 1 is set to a position advanced from the position of the cutter 2a by the difference PCMP (=PE1−PE2) between the first and second positional deviations PE1 and PE2 prior to the start of the respective rotations of the workpiece and the tool. In the present embodiment, the first and second position loop gains PG1 and PG2 (=PG) are equal and the difference PCMP is negative, so that the cutter 2a is located in a position advanced from the position of the point A of the workpiece 1 by the absolute value of the difference PCMP, as shown in FIG. 3, and the rotations of the workpiece and the tool are started with the cutter positioned in this manner. Further, the whole machine tool is designed so that the move command variable PC1·x can be given as a value divisible by the pulse number P. Consequently, the cutter 2a comes to face the predetermined circumferential position A on the workpiece 1 just when the steady-state operation mode is established, so that a polygonal portion can be formed on the workpiece 1 in the manner such that the middle point of a side of the polygonal portion is in alignment with the predetermined position A.

Figure 4:
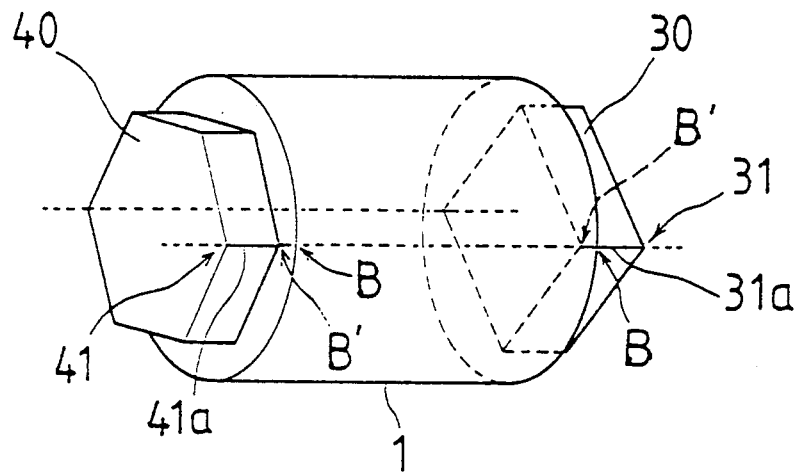
FIG. 4 is a perspective view showing a square portion and a hexagonal portion formed individually on the opposite end portions of the workpiece.
Figure 5:
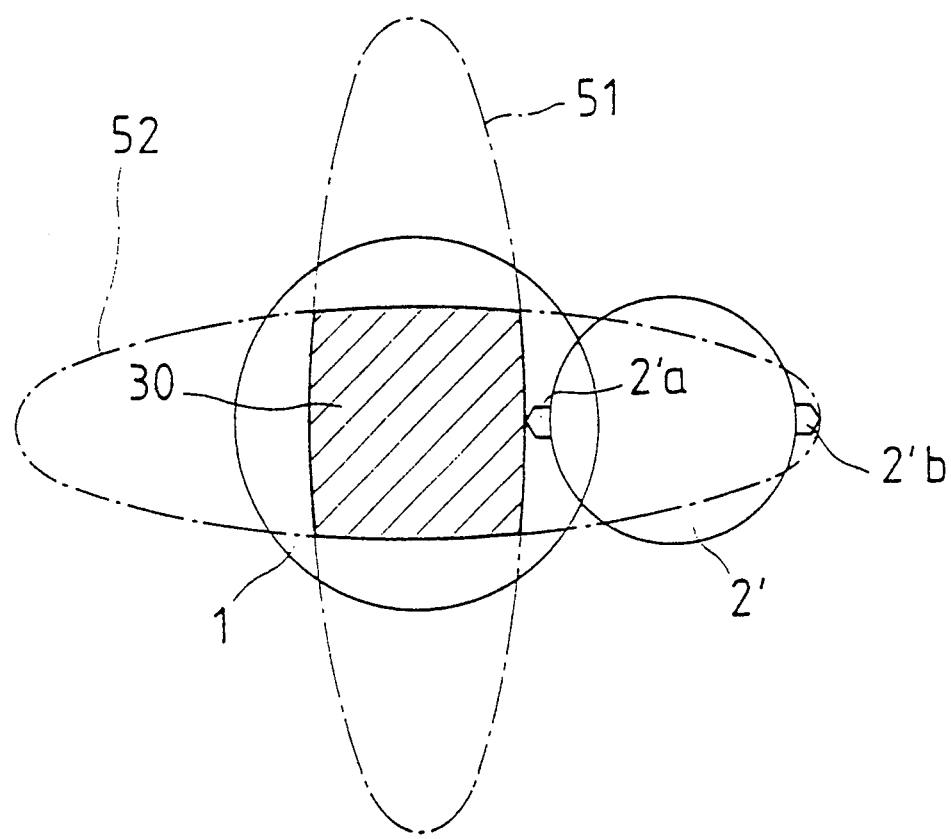
FIG. 5 is a view showing transfer paths of tool cutters used to form the square portion on the workpiece.
Figure 6:
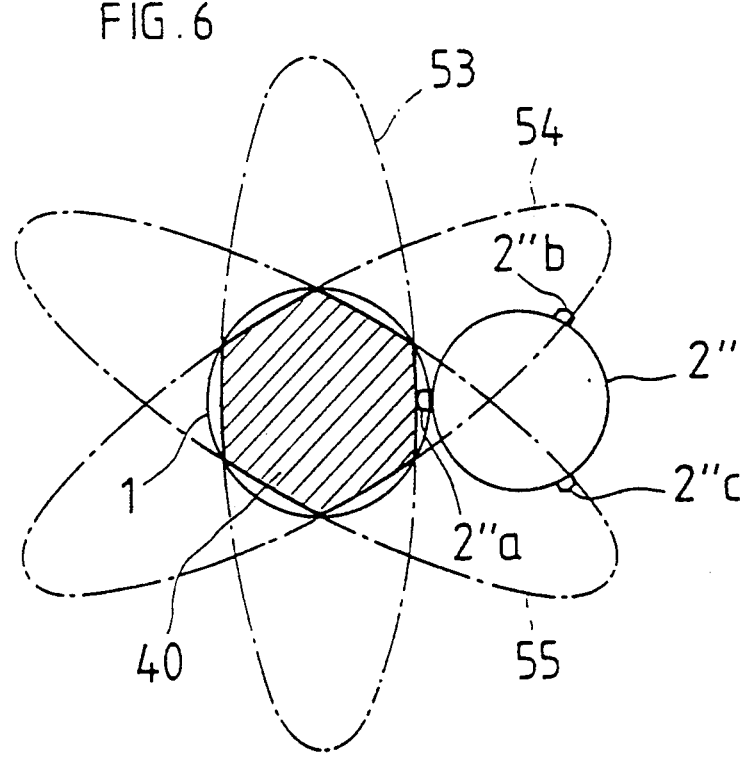
FIG. 6 is a view showing transfer paths of tool cutters used to form the hexagonal portion on the workpiece.

Referring to FIGS. 4 to 6, processes of polygon working using the machine tool of FIG. 1 will be described.

In the following description, it is supposed that a square portion 30 and a hexagonal portion 40 are formed individually on the opposite ends of the workpiece 1 in a manner such that one angle 31 of the square portion 30 and one angle 41 of the hexagonal portion 40 are in alignment with a circumferential position B on the workpiece 1, that is, both an edge 31a of the square portion 30 and an edge 41a of the hexagonal portion 40, respectively extending in the axial direction of the workpiece, both pass a circumferential position B', which corresponds to the predetermined circumferential position B on the workpiece 1 (FIG. 4).

First, the workpiece 1 is attached to the chuck 9 by an operator or by means of a workpiece attaching/detaching device (not shown) in a manner such that the workpiece 1 can be set meeting the predetermined requirement for the positional relation with respect to the first main spindle 3a, for example, that the predetermined circumferential position A on the workpiece 1 coincides with a mark on the end face of the chuck 9. Then, a tool 2' (FIG. 5) having two cutters 2'a and 2'b arranged at a circumferential angular distance of 180° from each other is attached to the chuck 10 by the operator or by means of a tool changer (not shown) in a manner such that the cutter 2'a faces the predetermined circumferential position A. Here, the point A corresponds to the middle point of a side of the polygon, and an angle of the polygon is formed on the point B. In working for the square portion, therefore, the points A and B deviate at 45° from each other.

Under these conditions, the polygon working is started in accordance with the polygon working program. First, the processor of the numerical control device 20 calculates the first and second positional deviations PE1 and PE2 based on the command workpiece rotational speed (corresponding to the first speed command VC1), the ratio 1:n between the workpiece rotational speed and the tool rotational speed, the pulse number P for each revolution of the workpiece and the tool, and the position loop gain PG, which will be read individually from the program, and then calculates the difference PCMP between the two positional deviations. Then, the second spindle motor Mb is driven through the second motor control circuits (7b, 6b), and the cutter 2'a is located in a position (corresponding to the position of the cutter 2a of FIG. 3) advanced from the position of the point A of the workpiece 1 by the amount of the calculated value PCMP.

After the positioning is finished, the numerical control device 20 cyclically sends out, according to the pulse distribution cycle ITP, the first and second move commands PC1 and PC2 respectively given by the following equations (5) and (6) respectively:

$$PC1 = (VC1/60) \cdot P \cdot ITP, \quad (5)$$
$$PC2 = (VC2/60) \cdot P \cdot ITP \quad (6)$$
$$= n \cdot PC1.$$

When the transmission of the first and second move commands PC1 and PC2 is started, the workpiece 1 starts to be rotated through the first motor control circuit (7a, 6a), first spindle motor Ma, first transmission system 5a, first main spindle 3a, and chuck 9. And, simultaneously, the tool 2 starts to be rotated through the second motor control circuit (7b, 6b), second spindle motor Mb, second transmission system 5b, second main spindle 3b, and chuck 10. Thereafter, the workpiece 1 and the tool 2 are rotated with delays in following up the first and second move commands PC1 and PC2, and the commanded workpiece rotational speed and the commanded tool rotational speed are reached at the X-th pulse distribution cycle, so that the steady-state operation mode for the rotations of the workpiece 1 and the tool 2 with the predetermined rotational speed ratio 1:n is established. The respective actual rotational positions L1 and L2 of the first and second main spindles 3a and 3b reached when the steady-state operation mode is established can be given by the following equations (7) and (8) respectively:

$$L1 = PC1 \cdot x - PE1, \quad (7)$$
$$L2 = PE2 - PE1 + n \cdot PC1 \cdot x - PE2 \quad (8)$$
$$= n \cdot PC1 \cdot x - PE1.$$

Here PE1 and PE2 represent the positional deviations for the total move command variables associated with the first and second main spindles 3a and 3b respectively during the time interval between the start of the respective rotations of the workpiece 1 and the tool 2 and the establishment of the steady-state operation mode.

Since the machine tool of the present embodiment is designed so that a value obtained by dividing the value PC1·x by the aforesaid pulse number P is an integer R, the actual workpiece rotational position L1 and the actual tool rotational position L2 reached when the steady-state operation mode is established are delayed from the position for completion of R-revolution and the position for completion of nR-revolution respectively, by the amount corresponding to the value PE1. In other words, the cutter 2′a faces the point A of the workpiece 1.

When the establishment of the steady-state operation mode is discriminated by the respective outputs of the first and second speed sensors 8a and 8b, the numerical control device 20 starts to send out the feed command PF to the third motor control circuit 6c. As a result, the tool 2 is moved from the working start position toward the workpiece 1 at the predetermined feeding speed through the feed motor Mc, second main spindle 3b, etc., whereby the polygon working by the cutters 2′a and 2′b will be started. During the polygon working, the cutters 2′a and 2′b respectively move drawing elliptical loci as are denoted by reference numerals 51 and 52. With respect to the workpiece 1 as shown in FIG. 5. As a result, the square portion 30, whose angle 31 is in alignment with the point B of the workpiece 1, is formed on one end of the workpiece 1. When working for the square portion 30 is finished, the tool 2 is returned to the working start position.

Then, the polygon working is carried out to form the hexagonal portion 40 on the other end of the workpiece 1. For this purpose, the end of the workpiece 1 on which the square portion 30 is formed is attached to the chuck 9 in a manner such that the workpiece 1 can be set maintaining the predetermined positional relationship with the first main spindle 3a, and a tool 2″ (FIG. 6) having three cutters 2″a through 2″c arranged at intervals of 120° is attached to the chuck 10 in a manner such that the cutter 2″a faces the point A of the workpiece 1. Then, polygon working by the cutters 2″a through 2″c is started. The polygon working procedure is the same as that for forming the square portion 30 except that the angular distance is 30° between the point A at which the cutter faces the work and the point B at which an angle of the hexagonal portion is formed, so that the description of the procedure is omitted here. During the polygon working, the cutters 2″a through 2″c move drawing elliptic loci denoted by reference numerals 53 to 55 respectively with respect to the workpiece 1 as shown in FIG. 6. As a result, the hexagonal portion 40, whose angle 41 is in alignment with the point B of the workpiece 1, is formed on the end of the workpiece 1.

The present invention is not limited to the embodiment described above, and various modifications may be effected therein.

In the foregoing embodiment, for example, the tool to be used has a plurality of cutters; however, a tool having one cutter may be used. In forming a square portion on a workpiece using a tool with one cutter, a pair of opposite faces of the square portion can be formed on the workpiece by feeding the tool as it is rotating at a speed twice as high as the rotational speed of the workpiece. Then, after loosening the chuck and rotating the workpiece by 90° round the workpiece axis, the workpiece is held again by the chuck, and the rest of two faces of the square portion can be formed by repeating the same procedure. In forming a hexagonal portion on the workpiece using the tool having one cutter, three every other faces of the hexagonal portion are formed by feeding the tool at a speed three times the rotational speed of the workpiece. Then, the rest of three faces of the hexagonal portion can be formed by feeding the tool in the same manner after shifting chucking position by 60°.

We claim:

1. In a polygon working method for a machine tool having the first main spindle fitted with a workpiece and the second main spindle fitted with a tool, polygon working comprising:
   (a) starting simultaneously the rotation of said first and second main spindles with a cutter of said tool opposed to a circumferential position of workpiece, which is deviated from the predetermined circumferential position of said workpiece by the amount corresponding to the difference between a first positional deviation, which is produced in association with said first main spindle during the time interval between the start of the rotation of said first main spindle and the establishment of a steady-state operation mode such that said first and second main spindles rotate with a predetermined rotational speed ratio, and a second positional deviation, which is produced in association with said second main spindle during the time interval between the start of the rotation of said second main spindle and the establishment of said steady-state operation mode; and
   (b) starting relative feed of said workpiece and said tool when said steady-state operation mode is established.

2. A polygon working method according to claim 1, wherein said machine tool includes the first control section for controlling the rotation of said first main spindle by means of the first position loop gain in accordance with the first command speed for said first main spindle, and the second control section for controlling the rotation of said second main spindle by means of a second position loop gain in accordance with the second command speed for said second main spindle, said process (a) includes the process for determining said first positional deviation based on said first command speed and said first position loop gain and the process for determining said second positional deviation based on said second command speed and said second position loop gain.

3. A polygon working method according to claim 2, wherein said first positional deviation is calculated according to a first equation for calculation, which represents said first positional deviation by the function of said first command speed and the reciprocal of said first position loop gain, and said second positional deviation is calculated according to a second equation for calculation, which represents said second positional deviation by means of a function of said second command speed and the reciprocal of said second position loop gain.

* * * * *